United States Patent [19]
Manson

[11] Patent Number: 4,756,191
[45] Date of Patent: Jul. 12, 1988

[54] TEMPERATURE COMPENSATED GRAVITY MEASURING APPARATUS

[75] Inventor: Lewis A. Manson, Houston, Tex.

[73] Assignee: Sonora Corporation, Nacogdoches, Tex.

[21] Appl. No.: 876,116

[22] Filed: Jun. 19, 1986

[51] Int. Cl.⁴ ............................ G01V 7/00; G01N 9/14
[52] U.S. Cl. ...................................... 73/382 R; 73/453
[58] Field of Search ...................... 73/382 R, 447, 451, 73/453, 444, 448, 449

[56] References Cited

U.S. PATENT DOCUMENTS 1,748,596 2/1930 Christie et al. ........................ 73/444
4,290,307 9/1981 Manson .............................. 73/382 R

FOREIGN PATENT DOCUMENTS 929581 6/1955 Fed. Rep. of Germany ........ 73/444
480957 12/1975 U.S.S.R. ................................. 73/453

Primary Examiner—John Chapman

Attorney, Agent, or Firm—Pravel, Gambrell, Hewitt, Kimball & Kreiger

[57] ABSTRACT

An affinity type gravity measurement instrument which is composed of material such as wood having a coefficient of thermal expansion. Within an internal cavity defined within the housing is disposed a quantity of liquid and a float partially submerged in the liquid. The liquid and float have low coefficients of thermal expansion. The housing defines an internal temperature compensation cavity receiving liquid upon expansion thereof to thus minimize change in the height of the liquid column and thus change in the position of the float and target response to temperature change. A stem of the float extends through an opening at the upper portion of the housing and supports a target, the position of which is sensed by an eddy current, laser or radar proximity sensor, developing signals which are processed for digital readout and computer processed for mapping.

23 Claims, 3 Drawing Sheets

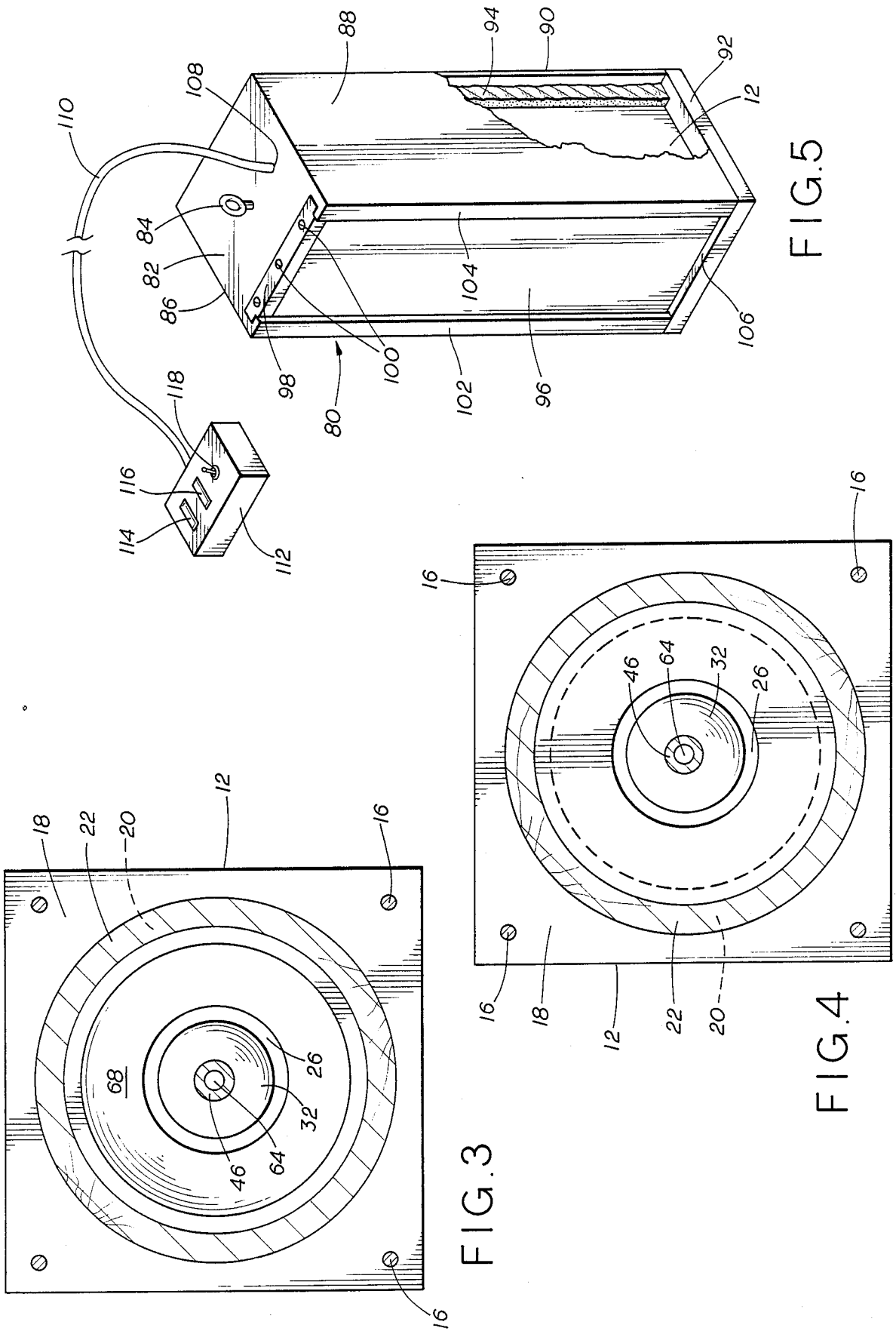

TEMPERATURE COMPENSATED GRAVITY MEASURING APPARATUS

FIELD OF THE INVENTION

This invention relates generally to the field of gravity measurement for the purpose of identifying subsurface anomalies that provide indication of the presence of ore bodies, hydrocarbon bearing formations, water bearing formations, etc. More particularly, this invention relates to an affinity type self-leveling gravity measuring instrument which, due to its construction, is relatively insensitive to ambient temperature changes and therefore may be utilized for extended periods of time without repeated calibration for optimum gravity measurements of an area of interest. The apparatus also compensates for barometric pressure changes due to changes in elevation and is compensated for the effects of minute seismic disturbances.

BACKGROUND OF THE INVENTION

Gravity, in the broad sense is defined as a vector force between the earth and a mass which is attracted to the earth. Being a vector force, gravity has three vector force components defined along mutually perpendicular directions. My earlier U.S. Pat. No. 4,290,307, issued Sept. 22, 1981, (hereinafter my "307" Patent) is directed to an apparatus which measures one of the component vectors, i.e., the vertical component. Another gravity instrument developed for measurement of the horizontal vector component of gravity is disclosed in my U.S. Pat. No. 4,271,702, issued June 9, 1981. The present invention takes the form of a gravity sensor which, though considerably different from the apparatus disclosed in U.S. Pat. No. 4,290,307, measures the vertical component of gravity and provides a more sensitive and efficient system yielding more efficient results as compared to the inventions disclosed in my previous patents.

Gravity is considered to be a three-dimensional vector force. Utilizing an X, Y, and Z-coordinate system, gravity can readily be defined as an attractive force between an object and the earth with the force having components in all three dimensions. If the coordinate system is conveniently defined at the center of the earth and the Y-axis is defined along the line between the earth and the object of interest, then the Y-component of gravity will be quite large compared to the X and Z-components. If they are conveniently defined as the north-south and east-west components (bringing into play the relatively well known surface coordinates on the earth), then those components are materially smaller. It will be appreciated that measurement of the Y or large component of gravity is extremely significant in certain scientific phenomena.

One phenomenon where gravity measurements of the earth are extremely helpful is in prospecting for minerals. The earth is not a homogeneous body. As a result, it is known that pattern variations in the measurement of the vertical component of gravity over a given geological region may very well show a set of variations which are coherently related to the geology of the region. As an example, large masses of iron ore create regional discontinuities in the measurements which, on proper interpretation, yield valuable information for determining the extent of the mass of iron ore in the earth.

While regional variations in gravity occur, variations also occur at a given locale over long or short periods of time as a result of a variety of reasons including, as an example, movement of extraterrestrial bodies. Accordingly, a set of base measurements over a period of time are usually deemed necessary to have a fixed base measurement whereby measurements taken in a large locale (for instance, in prospecting for various mineral deposits) are made so that all measurements can be referenced (by subtraction of time variations) to a common base station measurement to obtain time invariant measurements. To the extent that measurements at a given spot vary over a time interval, such variations are mathematically removed for the purpose of achieving a base station measurement taken in the locale. The present invention is a gravity meter which responds to variations in the vector component of gravity acting between the gravity meter and the earth and which converts such variations into a physical movement which can be measured and recorded on a time base chart.

The present invention has as one of its advantages a gravity measuring system using a hydraulically damped mass which mass moves in response to gravity variations. Such damping fairly well eliminates instrument system induced variations as might occur with an undamped structure. The mass moves responsive to variations over a period of time with sufficient damping so that overshoot, oscillations or transducer errors are not induced. The apparatus achieves this by utilizing a gravity attracted mass in a liquid bath.

During operation of the gravity measuring apparatus set forth in my "307" patent, one of the problems that has been experienced is the correlation of ambient temperature changes to the gravity measurements being taken. It is important that gravity measurement signals being transmitted to a computer system for signal processing, take into account the temperature at which the measurement was taken. Otherwise, gravity measurements uncompensated from the standpoint of temperature fluctuations, will exhibit errors. In the case of the apparatus of my "307" patent, changes in ambient temperature were rapidly conducted to the various components of the gravity measuring apparatus thus providing a requirement for temperature compensation. For example, during field operations a series of gravity measurements might begin early in the morning when the ambient temperature is quite cool. During the middle part of the day ambient temperature will typically increase, the ambient temperature being affected by the presence of wind, cloud cover and other natural phenomena. At each gravity measurement station the temperature at the time of measurement activity must be automatically or manually correlated with the gravity measurement thereby providing the computer system with appropriate temperature and gravity signals to insure that the graphical output of the computer plotter is accurately representative of subsurface anomalies. Though temperature related signals remain an important component for proper signal processing, the present invention is so compensated for temperature that temperature change within the measurement sensitive portion of the apparatus is quite slow and therefore gravity measurements between successive measurement stations will typically experience little or no temperature correction.

In a hydraulically damped gravity measurement system such as that shown in my "307" patent, movement of an internal float relative to detected changes in gravity are quite miniscule and therefore extremely sensitive position measuring apparatus are desired to achieve optimum results. In my earlier patent, miniscule gravity responsive movement of the float or tank 27 is multiplied by scale factors of from approximately 100 to 1000. This mechanical multiplier system provided sufficient measurement detection movement that a gravity change became more readily apparent. In accordance with the present invention, less complicated and more reliable position measurement equipment is utilized in accordance with the principles hereof to accurately detect and measure miniscule differences in the float position. In one form of the invention, gravity responsive positioning of a target is measured by an eddy current proximity sensor developing a position output signal that is digitized and displayed by a digital reader. A temperature responsive signal reflecting the temperature of the internal components of the system are also transmitted to and displayed by the digital reader. Field personnel are therefore enabled to simultaneously visualize internal temperature of the apparatus and gravity value. Also, if desired, these digital signals may be recorded on a computer disk for later processing to provide graphical representation of detected gravity signals.

In another form, position measuring apparatus may take the form of a laser activated system which is enabled to easily and quickly provide target position measurement signals to a degree of accuracy radically exceeding that of mechanical measurement apparatus. Other types of target positioning measurement systems, such as radar activated detectors may be deployed within the spirit and scope of the present invention.

From the foregoing, it will be understood how the apparatus is able to respond to variations in the vertical component of gravity which are converted into excursions of significant amplitude. They are converted and placed in a form enabling recording on a time based chart. Since the apparatus is temperature compensated and efficiently thermally insulated and may be set up at a measurement station and operated in a very short period of time, many successive stations may be measured without temperature compensation.

BRIEF SUMMARY OF THE DISCLOSURE

This disclosure is directed to a gravity measuring device utilizing a transducer mass having the form of a small, vented float which is partially submerged in a fluid. Venting of the float provides the float with compensation for barometric pressure changes and thus also compensates the apparatus for changes in site elevation. This float rises and falls in response to gravity attraction variations. The specific gravity of the liquid within which the float is partially submerged, together with the configuration of the float and the float cavity within which it is retained, provide the float with the capability of efficient movement responsive to changes in gravity, rendering the gravity measurement system quite sensitive. The float and the housing within which it is contained are composed of temperature resistant material having a low coefficient of thermal expansion, such as particular kinds of wood for example. The float is maintained in vertical or plumb position by appropriate ballast provided therein and is vented to insure balancing of the internal chamber thereof with barometric pressure. At the upper extremity of the float is provided an elongated tubular float stem member which protrudes through an opening in the upper portion of the housing to provide for detection of float movement externally of the housing. At the upper extremity of the float is provided a proximity target having an upper proximity detection plate, the position of which being very accurately measured by any one of several position measuring devices such as eddy current apparatus, laser measurement apparatus, radar measurement apparatus, etc.

The internal structure of the housing within which the float is received is provided with a groove configuration yielding more efficient temperature compensation.

BRIEF DESCRIPTION OF THE DRAWINGS

So that the manner in which the above recited features, advantages and objects of the invention, as well as others which will become apparent, are attained and can be understood in detail, a more particular description of the invention, briefly summarized above, may be had by reference to the embodiments thereof illustrated in the appended drawings, which drawings form a part of this specification.

It is to be noted, however, that the appended drawings illustrate only typical embodiments of this invention and are therefore not to be considered limiting of its scope, for the invention may admit to other equally effective embodiments.

FIG. 3 is a sectional view taken along line 3—3 of FIG. 1.

FIG. 4 is a sectional view taken along line 4—4 of FIG. 2.

FIG. 5 is an isometric illustration of a housing providing a protective enclosure for the gravity measuring apparatus of FIGS. 1 or 2.

DETAILED DESCRIPTION OF PREFERRED EMBODIMENT

Figure 1:
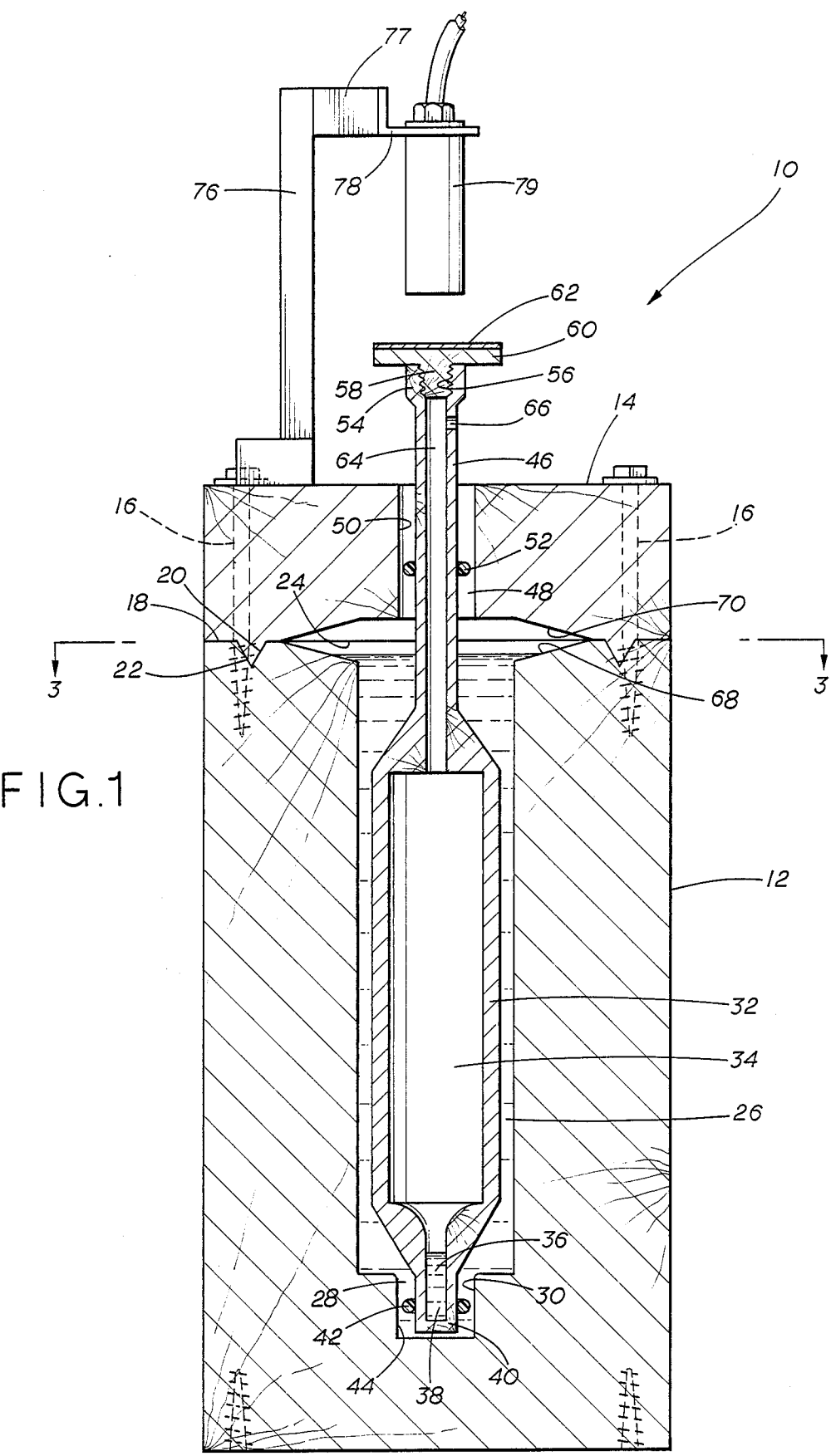
FIG. 1 illustrates a hydraulically damped, temperature compensated gravity measurement mechanism constructed in accordance with the present invention.

Referring now to the drawings and first to FIG. 1 a hydraulically dampened float type gravity measurement affinity instrument is illustrated generally at 10 including a housing or tank 12 which is preferably of generally rectangular configuration but which may take any other suitable form within the spirit and scope of the present invention. The housing 12 is formed of a material having excellent thermal insulation qualities as well as having a low coefficient of thermal expansion. Preferably, the housing 12 is composed of wood such as maple or walnut, for example, having dense fibers. The housing is preferably of square cross-sectional configuration with a minimum wall thickness in the range of about 2½ inches at the bottom and sides. The wall thickness provides sufficient thermal insulation quality that a time period of 1 to 6 hours at normal ambient temperature range will pass before the liquid within the housing begins to undergo a consequent temperature change. The bottom portion of the tank 12 is secured by bolts to the bottom wall of a protective enclosure such as shown in FIG. 5. The tank 12 is provided with a cover or closure 14 which is also composed of a material having efficient heat insulation capability and also having a low coefficient of thermal expansion. The closure 14 is also preferably composed of a dense wood material such as maple or walnut. The closure is secured to the tank 12 by a plurality of wood screws 16. All surfaces of the wood are sealed with urethane or any other suitable sealant.

The upper wall 18 of the tank 12 defines a circular seal groove 20 of V-shaped cross-sectional configuration which is adapted to receive a corresponding circular closure positioning projection 22 having a corresponding V-shaped cross-sectional configuration and extending downwardly from the lower surface 24 of the closure member. The V-shaped positioning and sealing groove and ridge are carefully machined to insure surface-to-surface contact as the lower closure surface 24 establishes contact with the surface 18 defined at the upper portion of the tank. The tank 12 is formed to define an internal cavity 26 which is essentially of cylindrical configuration and is provided with a reduced diameter lower cavity portion 28, also formed by a generally cylindrical wall section 30. Within the cavity 26 is provided a quantity of fluid having a low coefficient of thermal expansion. It has been determined that a silicone fluid has a very low coefficient of thermal expansion and is also efficient for hydraulic dampening and does not tend to foul internal components of the affinity instrument. The silicone fluid has a specific gravity which slightly dampens float movement yet allows the float to move easily responsive to gravity changes.

Within the chamber 26 is also positioned an elongated float 32 which forms an internal chamber 34. The float element 32 is composed of a material having excellent heat insulation quality and also having a low coefficient of thermal expansion. It has been determined that wood material such as kiln-dried mahogany is an excellent material for formation of the float element 32. It is not intended, however, to restrict the present invention to this particular type of wood or to wood itself since any suitable material may be employed which has both excellent thermal resistance and low coefficient of thermal expansion.

The lower portion 36 of the float chamber 34 is of reduced diameter and defines a ballast receptacle. Within the lower portion 36 of the chamber 34 is provided a suitable ballast material 38 such as liquid mercury, lead, or other suitable material having high specific gravity. The purpose of the ballast is to provide the lower portion of the float 32 with a "plumb-bob" effect causing it to readily seek a perpendicular position within the fluid disposed within the chamber 26.

Externally of the lower, reduced diameter portion 40 of the float member 32 a low friction ring 42 is provided which ordinarily does not engage the cylindrical surface 44 of the chamber 26. Should slight misalignment of the float 32 occur, the low friction ring 42 will establish substantially point contact with the chamber surface 44. Being composed of a material having an extremely low coefficient of friction, such as polytetrafluoroethylene for example, the friction or drag that occurs between the float element and the wall surface 44 is minimal and does not interfere with gravity responsive movement of the float member.

The upper end of the float element 32 tapers inwardly as shown to a reduced diameter float tube or stem 46 which extends through a vertical passage 48 formed in the closure member 14. This taper and the lower taper provides the float with a streamlined configuration making it readily movable and thus sensitive to slight changes in gravity from site to site. The passage 48 is formed by a cylindrical bore 50. Intermediate the extremities of the float tube 46 is provided an external low friction ring 52 which is composed of material similar to that of low friction ring 42. Upon slight lateral misalignment of the float member 32, the low friction ring establishes minimal contact with the cylindrical surface of bore 50 thereby minimizing frictional contact between the float and the closure member 14.

The upper portion of the float tube 46 is slightly enlarged as shown at 54 and is provided with internal threads 56 to receive an externally threaded depending portion 58 of a target member 60. The upper surface of the target member is formed by a thin metal sheet 62 of platinum, aluminum or any other material suitable for reflection of position measurement waves such as eddy current, laser beam, radar waves, etc.

It is desirable that the internal chamber 34 of the float member 32 remain balanced at all times with barometric pressure. Accordingly, the tubular float tube 48 defines a vertical passage 64 that is in communication with the internal chamber 34 of the float member. A small aperture 66 communicates the passage 64 with barometric pressure. There is no need therefore for compensation of the float system for barometric pressure changes because of the continuous balanced pressure condition that exist between the internal chamber 34 and barometric pressure.

The upper end of the tank design is such that changes of fluid elevation within the internal chamber 26 due to thermal effect are automatically compensated by a cavity having a tapered wall surface. The cavity exists around the entire upper portion of the tank. As the fluid level of the tank rises or falls due to thermal effect, the fluid moves laterally along the bottom surface of the cavity which is at a taper of approximately 25° upwardly from the horizontal. Thus, the fluid level is substantially maintained at the same level within the tank even though fluid volume slightly increases or decreases due to thermal effect.

As shown in the drawings, the embodiment of FIG. 1 defines a body cavity surface 68 of circular tapered form, having a taper of about 25° from the horizontal. Tapered surface 68 forms a lateral cavity enlargement receiving the fluid of cavity 26 the purpose of which is to ensure minimal vertical change in liquid height within chamber 26 as liquid volumetric changes occur responsive to temperature changes. Closure member 14 defines a corresponding tapered surface 70 having a corresponding but oppositely directed taper of about 25°. Thus, when the closure 14 is in assembly with the tank 12, a circular cavity is defined which receives fluid upon expansion of the liquid material within the chamber 26. The normal liquid level within the chamber 26 is approximately at the level where tapered surface 68 intersects the cylindrical surface forming the chamber 26. Upon temperature responsive increase in the volume of the fluid within chamber 26, the fluid material flows laterally into the tapered temperature compensation groove with only minimal change in elevation. This causes the housing or tank to be provided with temperature compensation rendering it relatively insensitive to temperature change. The taper of surface 68 causes fluid to drain back into cavity 26 in the event rough handling causes splashing of liquid into the liquid expansion portion of the cavity. This insures that proper liquid level is maintained within the cavity 26.

Figure 2:
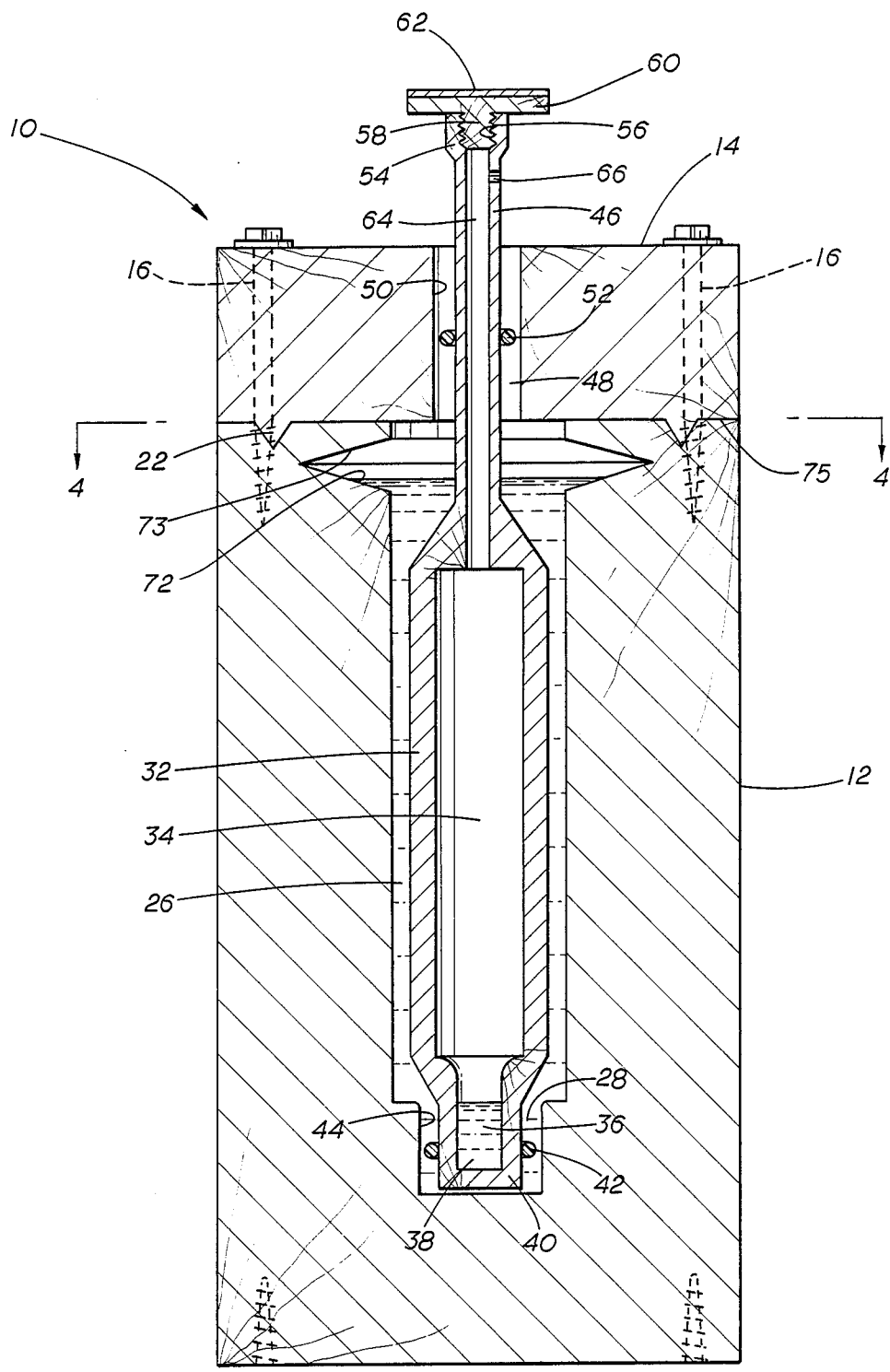
FIG. 2 is a sectional view of gravity measuring apparatus representing an alternative embodiment of this invention.

In accordance with FIG. 2 a temperature compensation groove is formed in the wall structure of the tank 12 by intersecting tapered surfaces 72 and 73. In this case the closure member 14 is provided with a substantially flat lower surface 75 with the circular V-shaped ridge 22 projecting downwardly therefrom in the manner discussed above in connection with FIG. 1. Otherwise, the structure of FIGS. 1 and 2 are substantially the same and for the same purpose.

Referring now again to FIG. 1, a support member 76 extends upwardly from the upper portion of the closure member 14. The support member 76 may be composed of wood such as mahogany or any other suitable material having a low coefficient of thermal expansion. A transverse projection 77 extends from support element 76 and receives an L-shaped support flange 78 which provides support for an eddy current proximity sensor 79 or any other suitable sensor detecting the position of the target 62 relative to the proximity sensor.

The equipment described above is designed to measure changes in gravity value, however slight. The changes in gravity value, from whatever cause, make the float member 32 rise or fall due to the value change of gravity from one gravity measurement site to another. The float and the case are self-leveling because the affinity unit is suspended from the upper portion thereof by a support ring attached to the case structure. The support ring is in turn supported by a support stand in such manner that the protective case seeks vertical orientation with plumb bob like activity.

As shown in FIG. 5, the protective enclosure or case is illustrated generally at 80 and includes an upper support wall 82 to which is secured a support ring 84 adapted to be received a suitable support device of a support stand. The single point support provided for the protective enclosure permits the enclosure and housing to be self-leveling such that the cavity and float are always oriented vertically. This single point support and the dampening effect of the silicone fluid provides the apparatus with compensation for seismic shocks however slight. From the top wall 82 extends a pair of parallel side walls 86 and 88 and a rear wall 90. The enclosure is completed by a bottom wall 92 to which the tank 12 is secured by bolts as described above. The various walls of the enclosure are typically composed of a wood material because of the efficient thermal insulation quality and low coefficient of thermal expansion thereof. A cork liner 94 in the order of 1 inch in thickness is affixed to the inner surface of each of the interior walls, thus providing the enclosure with efficient heat insulation characteristics.

The front wall 96 of the enclosure 80 is removable to gain access to the interior of the enclosure without complete disassembly thereof. The front closure panel 86 defines an upper flange 98 which may be secured in assembly with the upper wall 82 of the enclosure by means of screws 100. Opposed lateral portions of the removable panel are secured by opposed vertical flanges 102 and 104 which overlay the bottom plate. A lower flange 106 also secures the lower portion of the removable panel. When panel removal is desired the screws 100 are removed and a simple upward force is applied to the panel 96, causing it to slide upwardly. The panel may be completely removed as desired for access to the interior portion of the enclosure. When closed, the enclosure effectively prevents dust, dirt, etc., from contacting the housing, float tube and target.

The upper wall 82 is also provided with an aperture 108 through which extends a signal transmitting cable 110 having the inner extremity thereof in electrical connection with the proximity sensor and the opposite extremity thereof received by a hand-held digital reader 112 providing digital read out for temperature at 114 and gravity at 116. An appropriate switch element 118 is manipulated by the user to operate the digital reader after the affinity instrument has been positioned and stabilized for gravity measurement activity.

During operation, the apparatus may be set at a gravity reading station and within a few seconds time, the digital reader may be activated thereby providing a quick and efficient gravity reading. The device may be transported quickly to another gravity measurement site for another simple and quick gravity measurement. Through use of the equipment of this invention, a significantly long gravity traverse may be accomplished within a very short period of time. The change in gravity may be measured in several ways, i.e., by linear distance of movement by the float in parts per inch, deflection of angle of light, in milligrams of weight differential, by eddy current proximity sensor, by laser measurement device, radar measurement device, etc. This can include a method whereby the float drives a balanced indicator which amplified the float movement allowing the changes to be read on a visual scale.

The method utilized to measure float movement within the tank includes a digital reader which is connected by electric cable to an eddy current proximity sensor typically referred to as a gun. The proximity sensor is mounted above the float target at a prescribed distance (normally approximately ¼ inch). The signal of the proximity sensor which is converted into milligram increments bounces off of the float target and is converted electronically into a numerical value (milligrams) by the digital reader which in turn indicates the value on the face of the reader. The reader, whether it be the hand-held portable type for use in the field or the main base unit function in essentially the same manner. The main base unit of the signal processing system automatically records the daily diurnal curve produced by the float movement. This curve is then deducted from the field values obtained by identical instruments used in the field surveys. The computer program is designed to receive signal information of the main base unit and field units and to process the signals to extrapolate net gravity values. The computer program allows data manually put into the computer to be extrapolated by the field data and compensated by the diurnal curve, and if necessary, to compensate for temperature (a built-in factor in the program), compute net values for each station measured in the field and the matched time values are registered at both field stations and base station. These values are then printed out automatically from net results, and tabulated and processed by the built-in program stored in the computer. Additionally, a graph is plotted along with the data. A plotter coupled to the computer plots a graph, field station number field station value and prints nomenclature of the work.

Another component of the gravity measuring system of the present invention is the programming of the "normal" value of gravity in any given area. When values increase or decrease from "normal", the values are then indicated as (1) a fault zone, (2) a fracture zone, (3) a major change in the class of rock which could also indicate the presence of an ore body, or (4) a liquid bearing zone such as a hydrocarbon zone, water zone, etc. This program in the computer allows the print out of the values to be shown on the printed graph the four classes of values obtained in the field. The degree of change from normal allows the interpreter to immediately recognize any of the four types of changes and whether an ore body or a hydrocarbon or water zone is of commercial significance.

The data is then processed in a printing plotter which produces the four classes of distinct signals graphically.

In view of the foregoing it is respectfully submitted that the present invention effectively achieves all of the objects and features hereinabove set forth together with other features which are inherent from the description of the apparatus itself. While the foregoing is directed to the preferred embodiment, the scope of the present invention is determined by the claims which follow:

What is claimed is:

1. A temperature compensated gravity measuring instrument comprising:
   (a) an elongated float composed of a material having a low coefficient of thermal expansion, said elongated float including an elongated stem element;
   (b) housing means for receiving said elongated float therein;
   (c) said housing means being composed of a material having a low coefficient of thermal expansion;
   (d) said housing means having a chamber including an elongated vertically oriented cavity formed therein;
   (e) a liquid having a low coefficient of thermal expansion disposed within said chamber;
   (f) said housing means is of significantly great wall thickness that a period of time in the range of from about 1 hour to about 6 hours during normal ambient temperature changes will pass before temperature change of said liquid begins to occur;
   (g) said elongated float being positioned for free floating movement in said liquid within said elongated vertically oriented cavity in response to gravity variations;
   (h) said chamber further including a liquid expansion cavity having a surface tapered outwardly and upwardly above said elongated verticallyoriented cavity to allow outward expansion of said liquid and minimize vertical change in height of said liquid in said chamber responsive to temperature changes.

2. A temperature compensated gravity measurement instrument as recited in claim 1, wherein:
   said housing means is composed of wood.

3. A temperature compensated gravity measurement instrument as recited in claim 2, wherein:
   said housing means is of generally rectangular cross-sectional configuration and said elongated cavity is of generally circular cross-sectional configuration.

4. A temperature compensated gravity measurement instrument as recited in claim 2, wherein:
   said elongated float is composed of wood.

5. A temperature compensated gravity measurement instrument as recited in claim 4, wherein:
   said elongated float includes an internal chamber formed therein and said elongated stem is of tubular form defining a stem passage in communication with said internal chamber, said elongated stem further including an orifice formed therein communicating said stem passage and internal chamber with the atmosphere.

6. A temperature compensated gravity measuring instrument as recited in claim 5, wherein:
   ballast means is provided at the lower portion of said elongated float for maintaining the vertical positioning of said elongated float within said liquid within said chamber.

7. A temperature compensated gravity measuring instrument as recited in claim 6, wherein:
   (a) said elongated float includes a ballast receptacle forming a lower portion of said internal chamber; and
   (b) said ballast means is positioned within said ballast receptacle.

8. A temperature compensated gravity measuring instrument as recited in claim 1, wherein:
   (a) said housing means includes upper and lower internal guide surface at upper and lower ends of said chamber; and further including
   (b) upper and lower low friction elements secured externally of said elongated float and disposed for low friction engagement with said upper and lower internal guide surfaces upon slight lateral misalignment of said elongated float within said chamber.

9. A temperature compensated gravity measuring instrument as recited in claim 8, wherein:
   said upper and lower low friction elements are rings composed of a low friction material.

10. A temperature compensated gravity measuring instrument as recited in claim 1, wherein:
    (a) an air/liquid interface is formed within said chamber; and
    (b) said tapered surface of said liquid expansion cavity is located near said air/liquid interface.

11. A temperature compensated gravity measuring instrument as recited in claim 10, wherein:
    said liquid expansion cavity is defined inparty by oppositely directed intersecting frusto-conical surfaces.

12. A temperature compensated gravity measuring instrument as recited in claim 10, wherein:
    (a) said housing means is provided with a closure for the upper portion thereof; and
    (b) said housing means and closure each define frusto-conical surfaces disposed in intersecting oppositely directed relation.

13. A temperature compensated gravity measuring instrument as recited in claim 1, wherein:
    (a) said housing means forms a planar upper closure surface and a circular seal groove of V-shaped cross-sectional configuration; and
    (b) a closure is provided to close said housing means and includes a circular projection of V-shaped cross-sectional configuration fitting in sealed relation within said circular seal groove of said housing means.

14. A temperature compensated gravity measuring instrument as recited in claim 13 wherein:
    said housing means and closure form planar abutment surfaces that are in face to face substantially sealed engagement when said circular projection and circular seal grooves are in interfitting, substantially sealed relation.

15. The apparatus of claim 1, further including:
    means supporting said housing means in vertically oriented position at gravity measurement sites.

16. A temperature compensated gravity measuring instrument as recited in claim 15, wherein:
    (a) a protective enclosure receives said housing in fixed relation therein: and
    (b) said means supporting said housing means includes one point suspension means on said enclosure for permitting gravity assisted vertical positioning of said enclosure and housing.

17. A temperature compensating gravity measuring instrument as recited in claim 16, wherein:
  said protective enclosure is composed of thermally insulating material.

18. The apparatus of claim 1, further including:
  (a) a proximity target provided on said elongated stem element and exposed externally of said housing means; and
  (b) a proximity sensor supported in immovable relation with said housing means and providing electrical signals relating to relative positions of said proximity target.

19. A temperature compensated gravity measuring instrument as recited in claim 18, further including:
  signal receiving and processing apparatus connected with said proximity sensor for providing a digital readout of said electrical signals.

20. A temperature compensated gravity measuring instrument as recited in claim 18, wherein:
  (a) said proximity target and said elongated stem are composed of wood; and further including:
  (b) a proximity plate supported at an upper surface of said proximity target facing said proximity sensor.

21. A temperature compensated gravity measuring instrument, comprising:
  (a) an elongated float composed of wood, said float including an elongated stem element;
  (b) housing means composed of wood for receiving said elongated float therein;
  (c) said housing means having a chamber including an elongated vertically oriented cavity formed therein;
  (d) a liquid having a low coefficient of thermal expansion disposed within said chamber to substantially fill said elongated vertically oriented cavity;
  (e) said elongated float positioned for free floating movement in said liquid within said elongated vertically oriented cavity in response to gravity variations;
  (f) said chamber further including a liquid expansion cavity having a surface tapering upwardly and outwardly above said elongated vertically oriented cavity to allow outward expansion of said liquid and minimize vertical change in height of said liquid in said chamber in response to temperature changes.

22. The apparatus of claim 21, further including:
  (a) a proximity target provided on said elongated stem element and exposed externally of said housing means; and
  (b) a proximity sensor supported in immovable relation with said housing means and providing electrical signals relating to relative positions of said proximity target.

23. The apparatus of claim 21, further including:
  means supporting said housing means in vertically oriented position at gravity measurement sites.

* * * * *